US006900822B2

(12) United States Patent
Germain et al.

(10) Patent No.: US 6,900,822 B2
(45) Date of Patent: May 31, 2005

(54) PERFORMANCE AND FLOW ANALYSIS METHOD FOR COMMUNICATION NETWORKS

(75) Inventors: Pierre Germain, Aix en Provence (FR); Philippe Nicolal, Aix en Provence (FR)

(73) Assignee: BMC Software, Inc., Houston, TX (US)

( * ) Notice: Subject to any disclaimer, the term of this patent is extended or adjusted under 35 U.S.C. 154(b) by 616 days.

(21) Appl. No.: 09/923,567

(22) Filed: Aug. 7, 2001

(65) Prior Publication Data

US 2003/0020764 A1 Jan. 30, 2003

Related U.S. Application Data (60) Provisional application No. 60/275,613, filed on Mar. 14, 2001.

(51) Int. Cl.[7] .................................................. G09G 5/00
(52) U.S. Cl. ....................... 345/736; 345/734; 345/772; 345/853; 714/46; 714/47
(58) Field of Search ................................. 345/734, 735, 345/736, 771, 772, 783, 846; 714/46, 47, 28–43

(56) References Cited

U.S. PATENT DOCUMENTS

| | | | | |
|---|---|---|---|---|
| 5,841,981 A | * | 11/1998 | Kondo | 709/223 |
| 5,999,604 A | * | 12/1999 | Walter | 379/133 |
| 6,040,834 A | * | 3/2000 | Jain et al. | 345/853 |
| 6,496,209 B2 | * | 12/2002 | Horii | 345/853 |
| 6,535,227 B1 | * | 3/2003 | Fox et al. | 345/736 |
| 6,687,750 B1 | * | 2/2004 | Messinger et al. | 709/224 |
| 6,691,256 B1 | * | 2/2004 | Cook et al. | 714/43 |

* cited by examiner

Primary Examiner—Ba Huynh
(74) Attorney, Agent, or Firm—Wong, Cabello, Lutsch, Rutherford & Brucculeri, LLP (57) ABSTRACT

A system and method are used for visually representing performance and flow analysis of a communication network having devices connected by links. The system includes a first memory for storing a graphical representation of the communication network and showing the devices connected by links and a second memory storing data representing performance and flows in the communication network. A processing system is operatively connected to the first and the second memory and to a display. The processing system selectively maps the data on the graphical representation of the communication network by varying visual characteristics of the devices and the links for viewing on the display.

8 Claims, 9 Drawing Sheets

PERFORMANCE AND FLOW ANALYSIS METHOD FOR COMMUNICATION NETWORKS

CROSS-REFERENCE TO RELATED APPLICATION

This application claims priority of Application No. 60/275,613, filed Mar. 14, 2001.

BACKGROUND OF THE INVENTION

Communication networks are increasingly becoming critical resources. In-depth understanding of the communication networks' behavior and what the physical and application flows that are crossing network devices is imperative in order for the communication networks to provide good quality of service to network service customers.

A communication network may consist, in part, of an enterprise network. An enterprise network typically includes geographically dispersed devices under the control of a particular organization. It may consist of different types of networks operating together as well as different computer systems. As such enterprise networks are getting larger and more complex, analyzing the performance or flows of these networks is a challenging task. This is due, in part, to the substantial amount of data an operator must review for such an analysis.

The present invention is directed to improvements in and analyzing performance and flow for communication networks.

SUMMARY OF THE INVENTION

The present invention relates to a method and system of analyzing collected performance and flow information for networks.

In accordance with one aspect of the invention there is disclosed a system and method for visually representing performance and flow analysis of a communication network having devices connected by links. The system includes a first memory for storing a graphical representation of the communication network and showing the devices connected by links and a second memory storing data representing performance and flows in the communication network. A processing system is operatively connected to the first and the second memory and to a display. The processing system selectively maps the data on the graphical representation of the communication network by varying visual characteristics of the devices and the links for viewing on the display.

In accordance with another aspect of the invention a system and method is provided for mapping performance and flow analysis of a communication network having devices connected by links. The system includes a first memory for storing a graphical representation of the communication network and showing the devices connected by links. A second memory stores data representing performance and flows in the communication network. A third memory stores a plurality of symbols representing different devices and a plurality of edges representing links. Processing means selectively map the data on the graphical representation of the communication network by varying visual characteristics of the symbols and the edges responsive to the performance and flows in the communication network to build a graphical display Further aspects and advantages of the invention will be readily apparent from the specification and from the drawings.

DETAILED DESCRIPTION OF THE INVENTION

Figure 1:
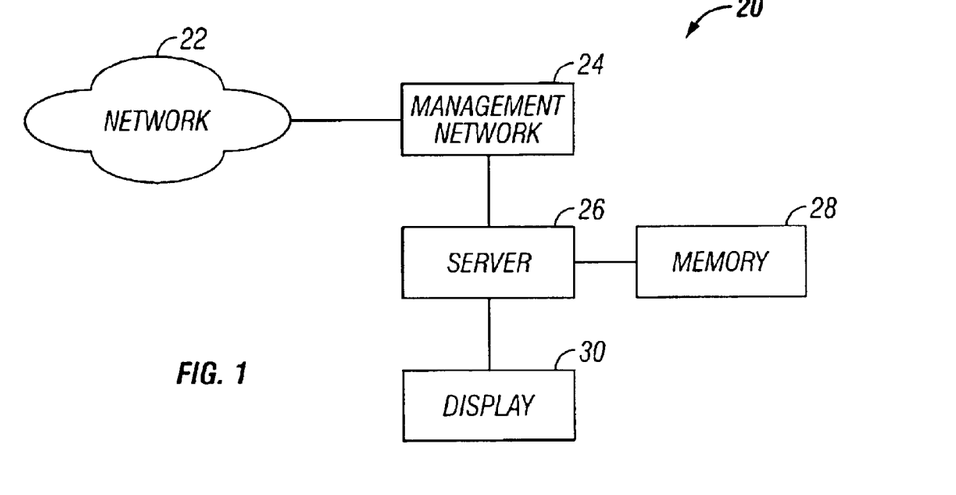
FIG. 1 is a block diagram of a system for performing performance and flow analysis for a network.

Referring initially to FIG. 1, a performance and flow analysis system 20 operates in connection with a communication network 22. The communication network 22 carries information between remote sites or computers. The information may consist of voice, video, files, electronic mail, etc. In the illustrated embodiment of the invention, the network 22 comprises a "packet" or "connectionless" communication model. The system 20 is intended to manage enterprise networks. However, it is also suitable for management service provides (MSPs) that manage a customer's networks.

The present invention relates particularly to "visualization" software operating in the network management system 20 for the visualization of peformance and data flows on the communication network 22. In the illustrated embodiment of the invention, the network management system 20 includes a dedicated management network 24 for gathering information from the communication network 22. A server 26 is connected to the management network 24. The server 26 operates in accordance with the visualization software, discussed above. A memory 28 and display 30 are operatively connected to the server 26. The memory 28 may consist of any type of memory, including ROM memory, RAM memory, fixed disk drives and removable disk drives, and the like. The memory 28 stores the visualization software and the collected information in the form of a database, as described below. As is apparent, the memory 28 may include plural discrete memory devices. Also, individual memory devices can be considered as equivalent to separate memory devices relative to the specific data stored therein.

As will be apparent, the management network 24 may take any known form and the server 26 may be an integral component of the management network 24. However, the server 26 is not intended to be a node in the communication network 22 as it hosts the visualization software for management purposes only.

The visualization software enables monitoring of information flows in real time or deferred time. Visualization of traffic is enabled over a specific time span to quickly pinpoint and understand cause of problems which may arrive periodically, such as, for example, bottlenecks, application slowdowns, etc. As such, the visualization software provides complete visibility of the flows and the evolution of the flows. This is done using physical mapping of the network for visualizing and understanding the complex exchange patterns between applications and users.

Figure 2:
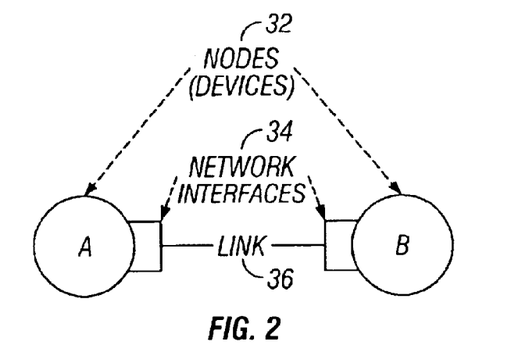
FIG. 2 is a graphical representation of how network elements are defined in a network topology.

Referring to FIG. 2, network devices A and B can be graphically represented as nodes 32. Network interfaces 34 associated with each node 32 are interconnected via a link 36. Network devices 32 can generally be classified as infrastructure devices, such as routers or switches, or the like, which are used for forwarding packets. The network devices 32 may also include terminal (LEAF) devices, such as servers, personal computers (PCs), work stations, printers, etc., that provide information to or consume information from other devices. The links 36 are mainly characterized by their technology, such as Ethernet, ATM, etc., and their transmission speed which is usually represented in bits/second. The links 36 link network devices 32 through the network interfaces 34 with one network interface 34 on each side of the link 36. In accordance with the invention, the network management system 20 displays the network elements shown in FIG. 2 in the form illustrated in FIG. 3. Particularly, the device nodes 32 are shown connected via a graph edge 38. The edge 38, which also may be referred to as an "arc", is the chart of a link 36 which interconnects two network node devices. Thus, a link 36 is an object of the network, which is graphically displayed by an edge 38. The network interfaces 34 are hidden on the visual display.

Packet networks divide information into several smaller packets. These packets are then handled independently by network devices. The Internet Protocol (IP) communication protocol is a typical packet-oriented protocol. The network 22 in FIG. 1 is made up of a large number of infrastructure devices, such as switches or routers, that forward each packet in a required direction depending on a final delivery address. The success of a network is its ability to handle large amounts of information and to connect together virtually unlimited numbers of users. Network performance management in accordance with the invention is based on the periodical collection of local metrics or on traffic simulation. The metrics are related to a specific device or interface.

For effective network management, it is necessary to choose a set of metrics that will characterize the network's ability to transmit the flow of information that is submitted to it and qualify the type of traffic (for example per protocol or per application, and per direction of traffic). Examples of the most frequently used metrics for performance and flow analysis include;

input and output throughput of device interfaces, information loss rate per device and per interface, overrunning of internal device resources (processors, memories, queues . . . ), etc, Per Network protocol throughput (IP/IPX/. . . ), Per Application protocol throughput (HTTP/SMTP/NNTP/SAP/Oracle . . . ), etc.

The analysis of performance and flows require the processing of large amounts of collected data samples. Several hundred samples up to several hundreds of thousands of samples only represent an instantaneous snapshot of a network state, depending on the size of the network, and on its complexity. Furthermore, having a history of several sample periods is necessary to illustrate the dynamic nature of a network, and of its evolution. The present invention provides a specific and efficient presentation of the information in order to understand the complex system that the communication network represents.

The network management system 20, using samples of information, makes a snapshot of the network 22 and maps user-chosen metric values on a graphic representation of the physical network topology. Device-related metrics are mapped over the graph device nodes 32 while interface-related metrics are mapped over the graph edges 38. In accordance with the invention, the network management system 20 uses a graphic representation of topology of the network 22, techniques for representing metrics over the graph element, referred to herein as "mappings", automatic association methods between metrics and mappings, and an ergonomic and efficient presentation system, referred to herein as "views", that display only a subset of all available metrics.

Figure 4:
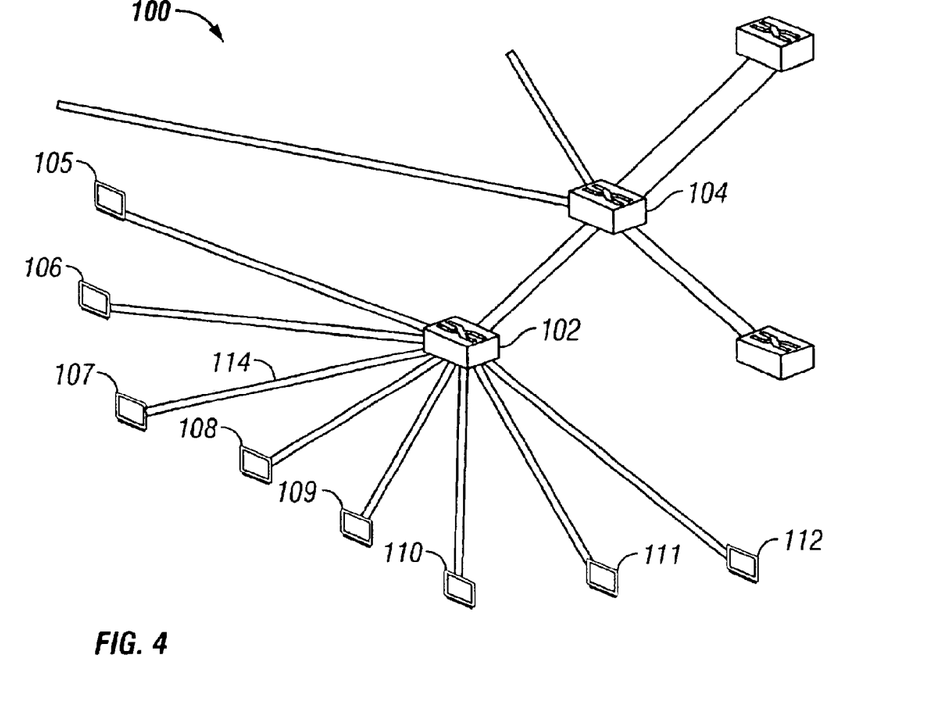
FIG. 4 is a graphical representation of a network topology.

Referring to FIG. 4, a classical graphical representation of the topology of a network 100 is illustrated. The network 100 includes two infrastructure devices in the form of switches 102 and 104 connected to LEAF devices in the form of PCs 105-112. Node devices are represented by symbols. Different symbols are drawn depending on the device type and on the services the device provides. These services may include routing services, switching services, VLAN (Virtual Local Area Network) service, etc. In order to be compared, the node devices occupy approximately the same area on a visual display. Links are represented as connections between devices. An example is the line 114 between the PC 107 and the switch 102. The links have speeds that can vary from several kilobits per second to gigabits per second. The size of the link reflects the nominal speed of the link in the classical representation. Particularly, the thicker the line, the faster the link.

Figure 5:
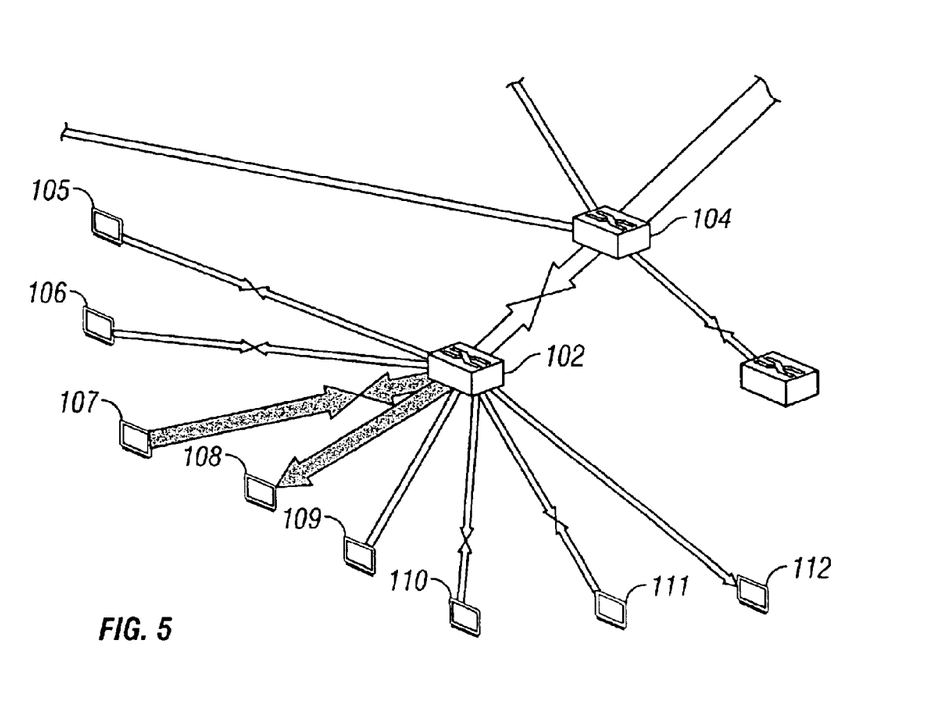
FIG. 5 illustrates a display generated in accordance with the invention for illustrating performance and flow for the topology of FIG. 4.

The present invention provides dynamic visual representation of a network. This is done to represent network load along with network resources used. To do so, it is necessary to choose a few metrics out of the set of available metrics. These metrics may include, for example, the device load (number of packets per second handled by the device), the link throughput (bits per second) for each direction, and the link load (for example, a percentile of its nominal throughput). FIG. 5 illustrates mapping of the metrics in accordance with the invention for a network having a topology as shown in FIG. 4. As is apparent, the node devices 102 and 104 have different sizes when compared to the representation of FIG. 4, and the links are displayed as bidirectional arrows. Particularly, the size of each infrastructure element depends on the number of packets that go through the element. In the illustration of FIG. 4, the switch 104 carries more packets than the switch 102 resulting in the larger size. Bidirectional arrows have a different thickness and a different contact point. The thickness and contact points depend on the throughput of each direction. In the illustration of FIG. 5, it is apparent that there is a large flow of information going from the PC 107 through the switch 102 and then to the PC 108. This traffic is far greater than the traffic involving the other PCs 105, 106 and 109–112. The color of the link also depends on the link utilization rate. In the illustration of FIG. 5 this is represented by the darker color for the transfer from the PC 107 to the PC 108 as it requires more link resources than all the other links in FIG. 5.

The mappings, i.e., techniques for representing metrics, are used to graphically represent different types of information. The mappings allow a user to visually and quickly evaluate a metric (for example, see at a glance that a device load is near the device saturation) and compare several metrics of the same type (for example all the throughput on a network). The following describes several mappings that could be used. As is apparent, not all possible mappings are described herein.

Figure 6:
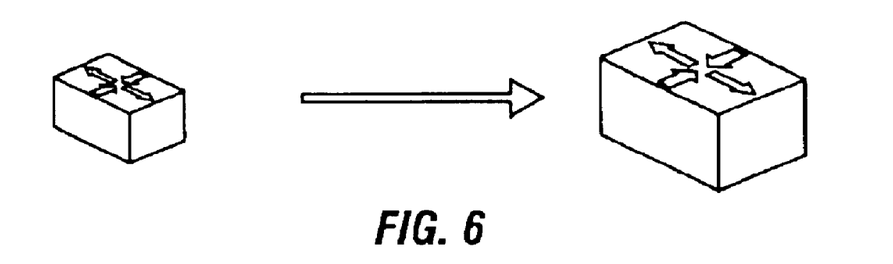
FIGS. 6–9 illustrate mapping techniques for representing metrics for different types of information in accordance with the invention.

Symbol size variation can be used for mapping symbols for node devices as illustrated in FIG. 6. Particularly, the size of the symbol can vary from a smaller size, as shown to the left of the arrow, and be increased to a larger size, as shown to the right of the arrow. The higher the metric value, the larger the size of the node on the screen. Similarly, symbol color variation can be used by applying a color transparency level on the symbol. The higher the metric value, the higher the color level. A combination of this kind of mapping can be used with other mappings such as symbol size.

Figure 7:
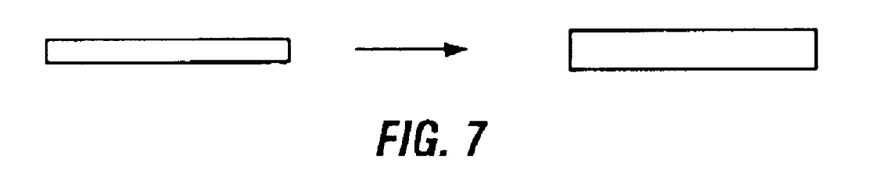
Figure 8:
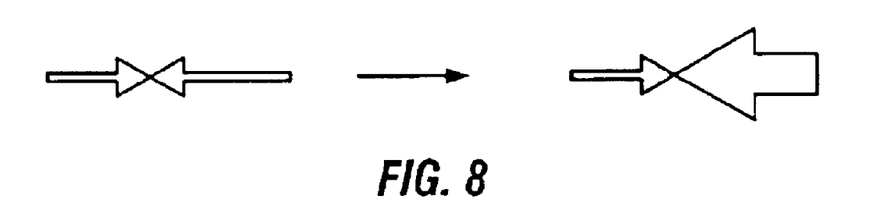
Figure 9:
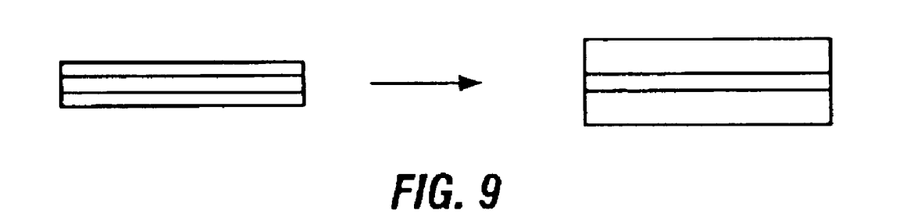

FIGS. 7–9 illustrate mapping symbols for links. Particularly, FIG. 7 illustrates link thickness variation. The higher the metric value, the thicker the link. FIG. 8 illustrates bidirectional thickness variation. This mapping simultaneously represents two metrics of the same type. The higher the metric value, the larger the associated arrow. Also, the contact point of the arrows changes according to the relative metric values in the two directions. FIG. 9 illustrates link layer thickness variation. This mapping represents simultaneously several metrics of the same type. The higher the metric value, the thicker the associated layer. Line color variation or bidirectional color variation may also be used with mapping symbols for links. This is done by applying a color transparency on the link. The higher the metric value, the higher the color level on the link or on the associated arrow.

In the illustrated embodiment of the invention, several mappings are general purpose mappings as they can be used very frequently and applied to a large number of metrics. These include size variation, thickness variation and color variation which are well suited for the visualization of the metrics such as load, volumes and rates, or the like. For example, the CPU load of a device, a link throughput, the utilization rate of a device or of a link, or the collision rate of an Ethernet link. Other mappings better fit other situations. For example, bidirectional arrows are well suited for oriented metrics. For example, flows going into or out of a device, errors detected on incoming packets, or errors detected on outgoing packets. Color layers are well suited for distribution of homogeneous metrics. For example, visualization of traffic on a link, per communication protocol, per application or per VLAN, or distribution of the traffic on a link per computer contributing to this traffic.

In order to provide a complete visualization technique, it is necessary to handle special situations. These include:

Representation of an "in range" value: a value greater or equal to a minimum value and, lower or equal to a maximum value (These values must be user definable). Representation of a value lower than the minimum value (out of range value). Representation of a value greater than the maximum value (out of range value). Representation of a missing value. This is a very frequent situation, often due to an unreachable or out of order device due to network or instrumentation problems.

For the first case (in range value) the "mapping" must represent linearly the metric value.

For the other cases, this can be qualified as "remarkable", the mapping must define for each situation a representation that allows to distinguish very easily this special value from an "in range" value.

The following table shows the various representations for each situation of the Mappings described above:

| Mapping | Missing value | Value < minimum | [min >= value <= max] | Value > maximum |
| --- | --- | --- | --- | --- |
| Symbol size | Dashed corners | Very small symbol | Symbol size linearly modified. | "Exploded" Symbol |
| Symbol color | Transparent | User defined color | Color transparency level applied linearly | User defined color |
| Link thickness | Standard thickness Dashed line | Thickness set to 1 pixel | Thickness linearly modified | Maximum thickness + Dashed borders |
| Link color | Transparent | User defined color | Color transparency level applied linearly | User defined color |
| Bi-directional arrow thickness | Standard thickness Dashed arrow | Thickness set to 1 pixel | Thickness linearly modified | Maximum thickness + Dashed borders |

The symbols and edges used in the mapping technique are stored in the memory 28. When metrics are selected to build a display the appropriate symbols or edges are selected from the memory in accordance with the metrics to be analyzed, as will be apparent.

Figure 3:
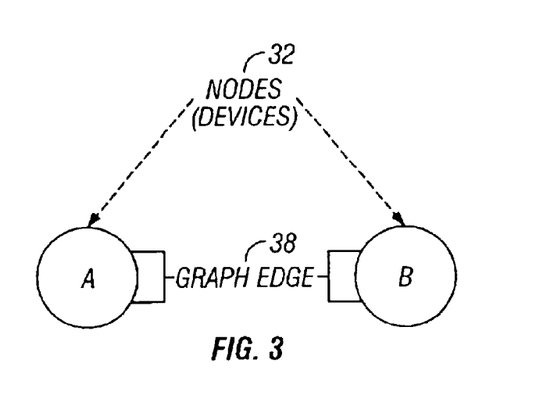
FIG. 3 is a graphical representation of how the network elements of FIG. 2 are illustrated in a display system in accordance with the invention.

For association methods between metrics and mappings, metrics can be collected in various manners. Among these are real time counters polling from the devices, information pushed from devices or to the system, or a query from a database, the database being fed by a collection process. Metrics are always associated with instrumented objects. An instrumented object is an object able to provide measurements. Network devices and network device interfaces are objects which can be instrumented. Often, a link is not an object which can be instrumented. Therefore, a metric is often not directly associated with a link. FIG. 2, discussed above, shows the real elements involved in a connection between devices. The presentation system representation is shown in FIG. 3. In order to facilitate presentation of metrics on an edge, the presentation technique herein defines rules that will associate these metrics with an edge:

that are directly related to the edge when direct edge metrics are available, or that are not directly related to the edge when direct edge metrics are not available, and relevant metrics are available elsewhere.

The visualization software includes a metric/mapping association system. This system is in charge of finding all relevant metrics for each type of presented objects (nodes/edge) from the set of all available metrics. The system also applies rules to select the best metric when several choices are available. In certain cases, most notably edges, the system hides the metric choice complexity, thus making it seem to the user that all metrics are directly "collected" from the presented object.

Figure 10:
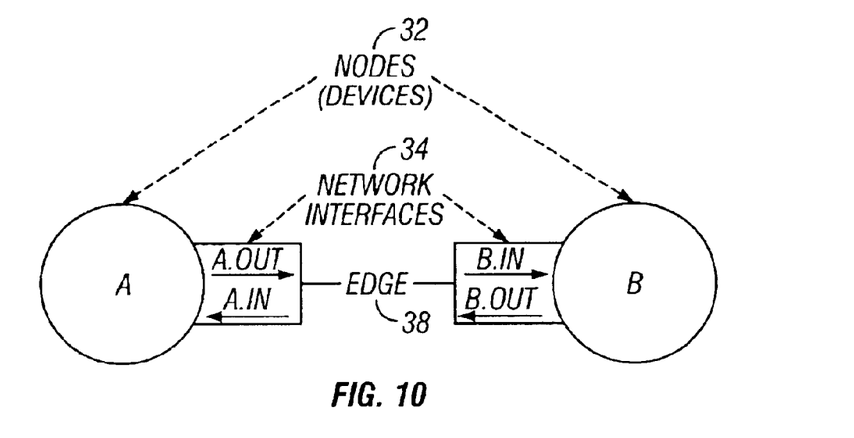
FIG. 10 is a graphical representation, similar to FIG. 3, representing bidirectional flows between two devices.

FIG. 10 illustrates an example where metrics are gathered from ends of the edge. The available metrics are the input and output throughput for each device 32. This information comes from the device interfaces 34. In the illustration, they are named "A.in", "A.out", "B.in" and "B.out". Normally, A.in provides the same values of B.out, and A.out provides the same values as B.in. Representing the throughput going from A and B (named "A.O" and "B.O") can be done in four ways:

| | | |
|---|---|---|
| A.O=A.out, | B.O=B.out | (metrics issued from two ends) |
| A.O=A.out, | B.O=A.in | (metrics issued from only one end: A) |
| A.O=B.in, | B.O=B.out | (metrics issued from only one end: B) |
| A.O=B.in, | B.O=A.in | (metrics issued from the two ends, but inverted) |

Figure 11:
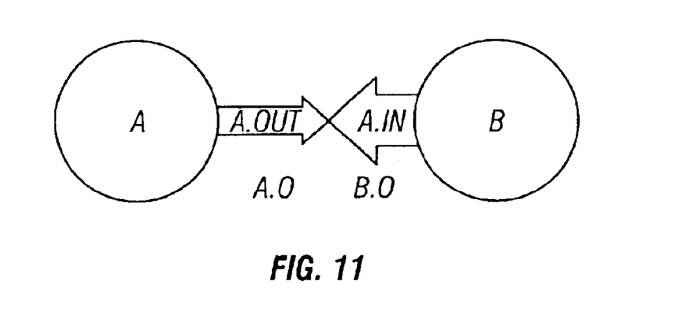
FIG. 11 is an exemplary display of bidirectional flows between two devices.

An example is illustrated in FIG. 11.

In certain cases, metrics are only available at one end of an edge. This reduces the number of possible choices. Among others, possible cases include only one device being instrumented. In this case, the only choice is [A.O=A.out, B.O=A.in], or [A.O=B.in, B.O=B.out] depending on the instrumented device. Another possible case is that there is a missing metric on one side. For example, B.out is missing. In this case, the number of choices is reduced to two, i. e., [A.O=A.out, B.O=A.in] or [A.O=B.in, B.O=A.in].

The following illustrates an example of representing a number of Ethernet collisions on an edge between two devices. This example relates to a situation where the metric available on a device interface is related to the link, although it is provided by the interface. The collision number is a metric that is usually provided by a device interface, but it represents the number of collisions detected on the media, not on the interface itself. Although this metric is provided by a device interface, it is in fact related to the edge on the graphic representation of the network. The metric/mapping association system has to associate this interface metric with the edge, or will have to choose, randomly or arbitrarily, one metric in case this metric is available on the two ends.

Every network element, such as a node or an edge, can provide dozens of metrics. Physiologically, a person is unable to perceive such a great amount of information at the same time, for each node.and edge representing a network. Assuming a person is able to perceive two to three different metrics per element type, there are a maximum of six different metrics for a network representation made of two types of elements, namely nodes and edges. The visualization software described herein applies a "view" principle to the presentation and mapping techniques described. A view is a subset of metrics per element type. This subset is applied to the graph that represents the network and is a subset for nodes, typically up to two, and a subset for edges, typically up to three. Each metric is applied to all the elements of the same type. For example, if the CPU utilization metric is chosen for nodes, then all the nodes will display their CPU utilization metric. The view principle allows the user to focus on one or several aspects of the network. For example, flow analysis, congestion analysis or state analysis. Flow analysis considers the kind of traffic, the communication protocols used, the applications used and the volumes being transferred. Congestion analysis considers the bottlenecks, the resource usage and collisions. The state analysis considers which devices or links are down, the availability of the devices, and the most frequently faulty devices. Alternative types of use might also be used.

Figure 12:
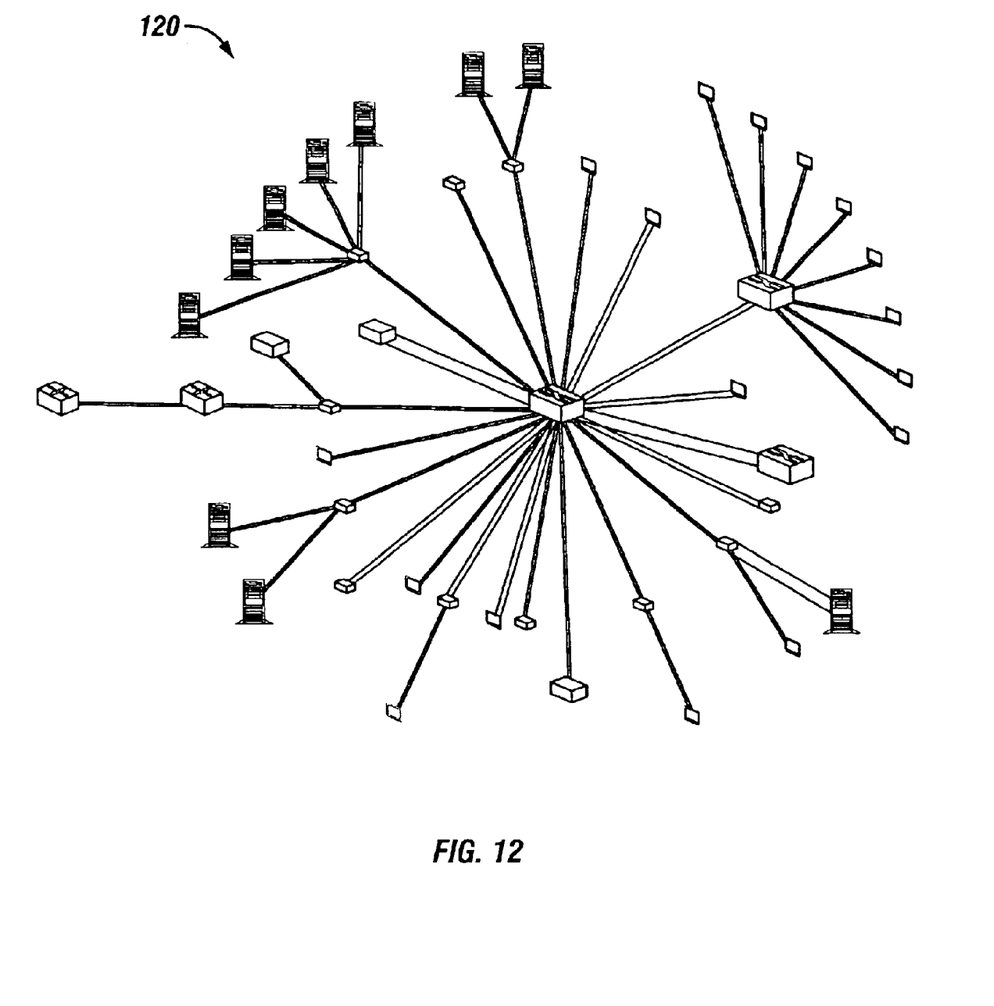
FIG. 12 is a graphical representation of a network topology for a view usage case in accordance with the invention.
Figure 13:
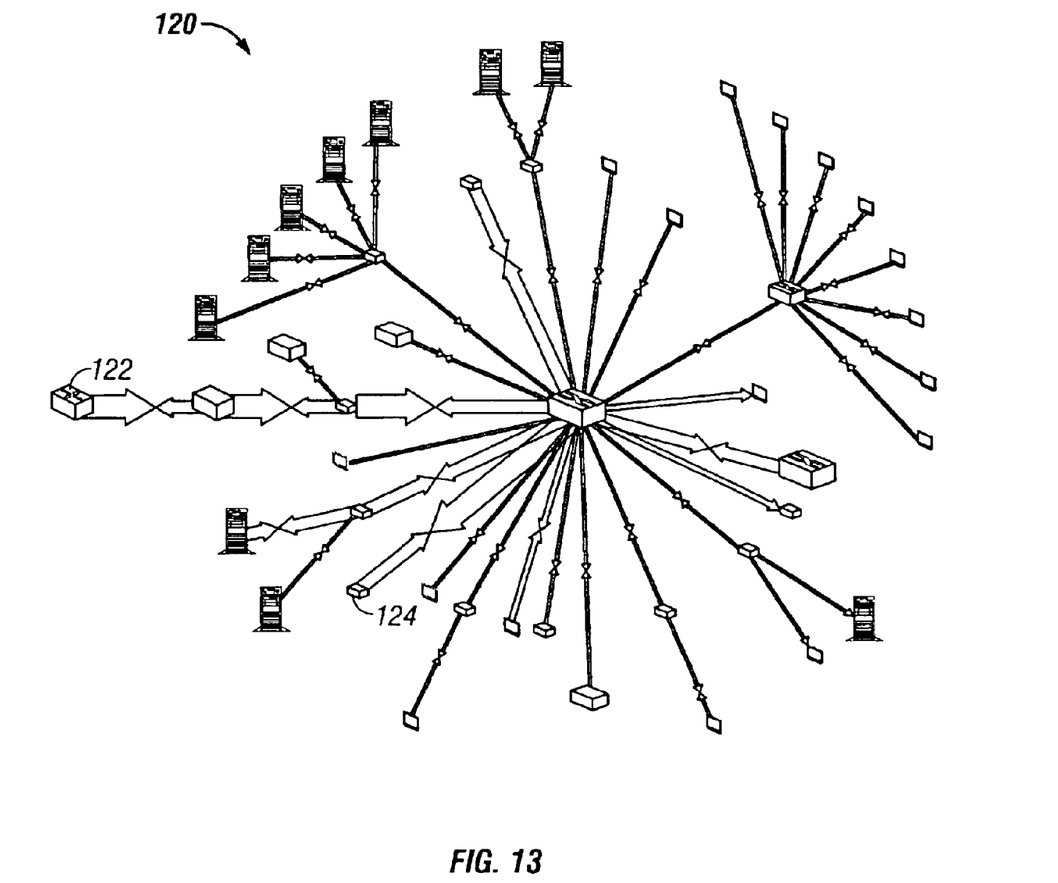
FIG. 13 is an illustration of a display for the topology of FIG. 12 for illustrating a flow/volume view usage case.

FIG. 12 illustrates a network to be analyzed for a flow/volume view usage case. This view is based on three metrics. Device workload is mapped on device size. The higher number of packets across a device, the larger the device. Input and output throughput are mapped on edges, represented by bidirectional arrows. The higher the volume in one direction, the thicker the arrow. The total throughput on edges is represented by a color variation. The greater the traffic, the more color in the edge. FIG. 12 illustrates the topology for a network 120 to be analyzed for the flow/volume usage case. FIG. 13 illustrates a visualization display generated using the system 20 of FIG. 1 for the network 120 of FIG. 12 under certain conditions. Particularly, this view of FIG. 13 shows the current flows between devices and particularly pinpoints the greatest flow which is going from a device 122 to a device 124. This flow is through several other devices.

For a flow/congestion view usage case, the view is based on a different set of metrics. Device workload is mapped on device size. The higher number of packets across a device, the larger the device. Input and output throughput are mapped on edges, represented by bidirectional arrows. The higher the volume in one direction, the thicker the arrow. The link's usage rate is mapped on edges and represented by a color variation. The more congested the link, the more color in the edge.

Figure 14:
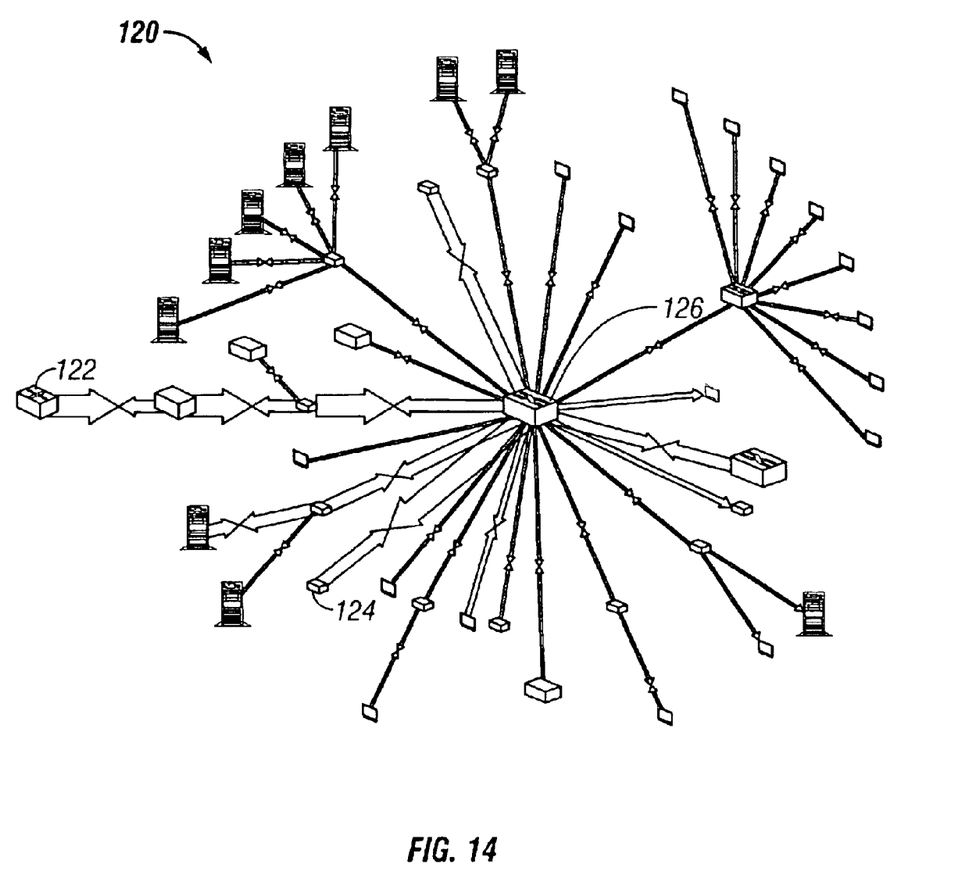
FIG. 14 is an illustration of a display for the topology of FIG. 12 for illustrating a flow/congestion view usage case.

FIG. 14 illustrates an example of a flow/congestion view usage case for the network 120. This view gives the user a new vision of the phenomenon. In fact, the link between the central device 126 and the device 124 has a higher transfer rate than the others. This means that although the transfer is great, the link is not overloaded. But the other links are near saturation. One can imagine that the transfer rate is limited by the links between the device 122 and the central device 126.

Other views such as views expressing the correlation between collision rate and response time or collision rate and volume, would provide valuable information for understanding the behavior of the network and analyzing it.

Figure 15:
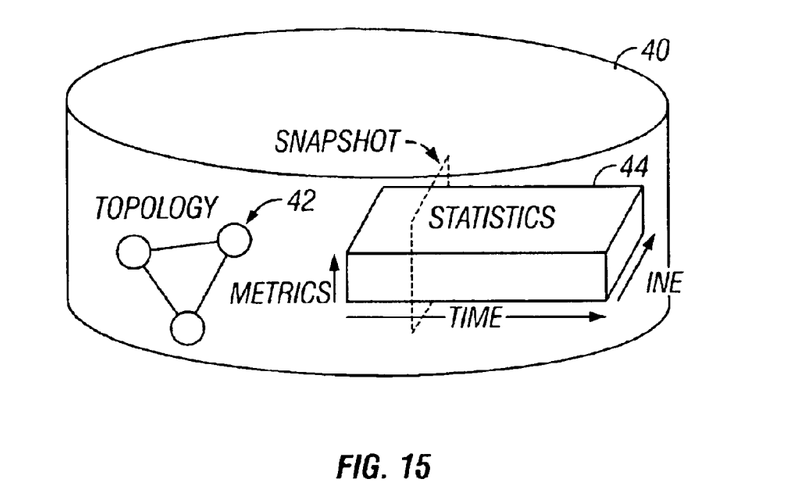
FIG. 15 is a generalized representation of a database for storing topology and statistical information used in the method and system of the present invention.

Referring to FIG. 15, a database 40 is represented graphically. The database 40 is stored in the memory 28 of FIG. 1, as described above. Among the information stored in the database 40 are topology representations 42 and metric samples in the form of statistics 44. These statistics are illustrated in three-dimensional form as "Ine" (representing instrumented network elements), metrics and time. A snapshot of these statistics represents a plane cut through the three-dimensional representation at a given time to illustrate the metrics at that time for all of the Ine's.

Figure 16:
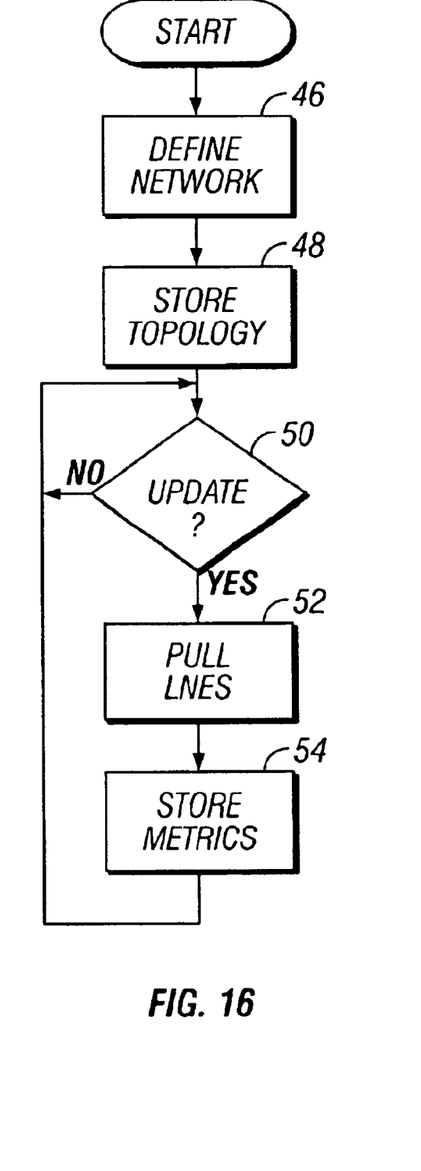
FIG. 16 is a flow diagram illustrating collection and storage of data for building the database of FIG. 15.

Referring to FIG. 16, a flow diagram illustrates a program implemented in the server 26 of FIG. 1 for building the database 40. The program begins at a block 46 where a network is defined. A network is defined by identifying the node devices 32 and edges 38 that make up the network to provide the network topology 42, see FIG. 15. The topology 42 is stored at a block 48. As is apparent, the database 40 may store numerous different network topologies. Thereafter, a decision block 50 determines if it is necessary to update the database statistics 48. The update is initiated at the appropriate time based on the techniques being used for collecting metrics, as discussed above. The program continues to loop about the block 50 until it is necessary to update the database. When an update is to occur, then the Ine's are polled at a block 52, in one embodiment. The collected metrics are then stored at a block 54 and the program returns to the decision block 50. The flow diagram of FIG. 16 will vary according to the particular collection process being used, as will be apparent to those skilled in the art.

Figure 17:
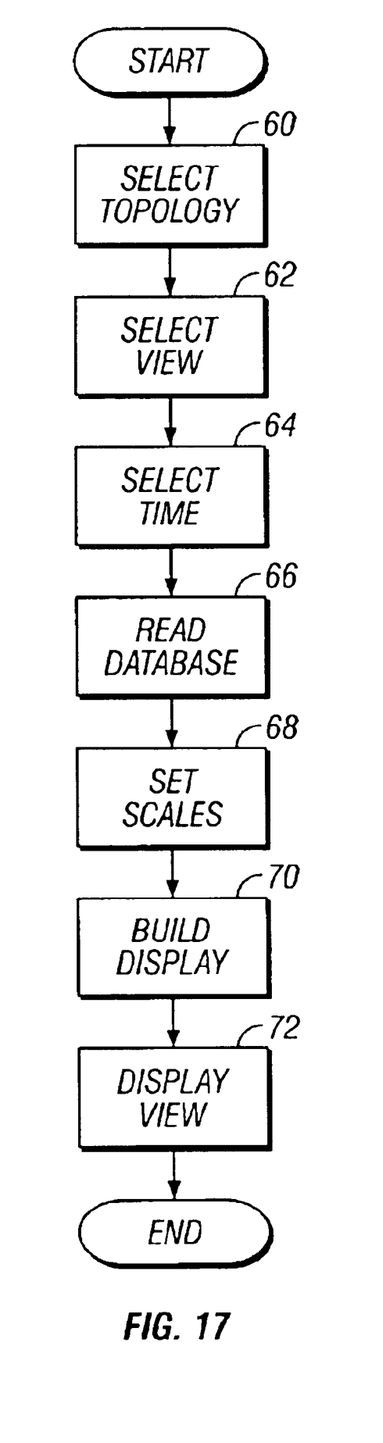
FIG. 17 is a flow diagram illustrating a visualization program algorithm in accordance with the invention.

Referring to FIG. 17, a flow diagram illustrates operation of the visualization program for performance and flow analysis for a communication network. The program begins at a block 60 where the user selects a topology to be analyzed and a part of the topology, if necessary. The server 26 accesses the topology from the database 40, see FIG. 15.

At a block 62 the user selects a view. The system 20 uses the view system in order to build a list of all metrics that could fulfill requirements. Depending on a previous list, and a set of elements that are instrumented, the system applies the rules defined in the metric/mapping association system, described above, to select the best available metrics. These are the metrics defined by the view or alternative metrics when the ideal metric is not available. At a block 64 the user selects the time for analysis. The time may be a specific time or date or may be an interval of time for analysis. The system 20 queries the statistics database 44 at a block 66 to retrieve the metric samples at the selected time. At a block 68 the system 20 sets scales to be used. For each type of metric the minimum and maximum values are searched to set the scales. For each type of metric the highest value of the scale is set to the maximum sample value found over the specified interval and the lowest value of the scale is set to the minimum sample value found.

Thereafter, a display is built at a block 70. The display is built using the selected topology and the mapping techniques for representing metrics, discussed above. This is done by using the correct mapping and applying the rules for the particular mapping. The display is then viewed at a block 72 on the display 30, see FIG. 1.

Figure 18:
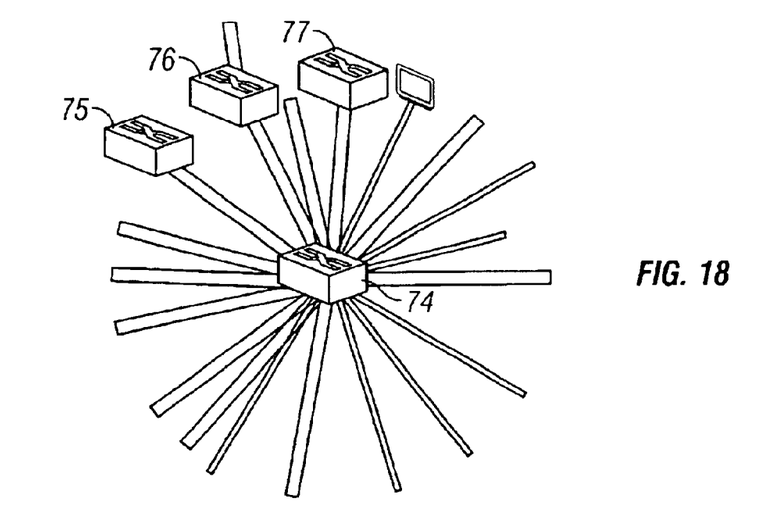
FIG. 18 is a graphical representation of a portion of the topology for illustrating operation of the visualization program of FIG. 17.
Figure 19:
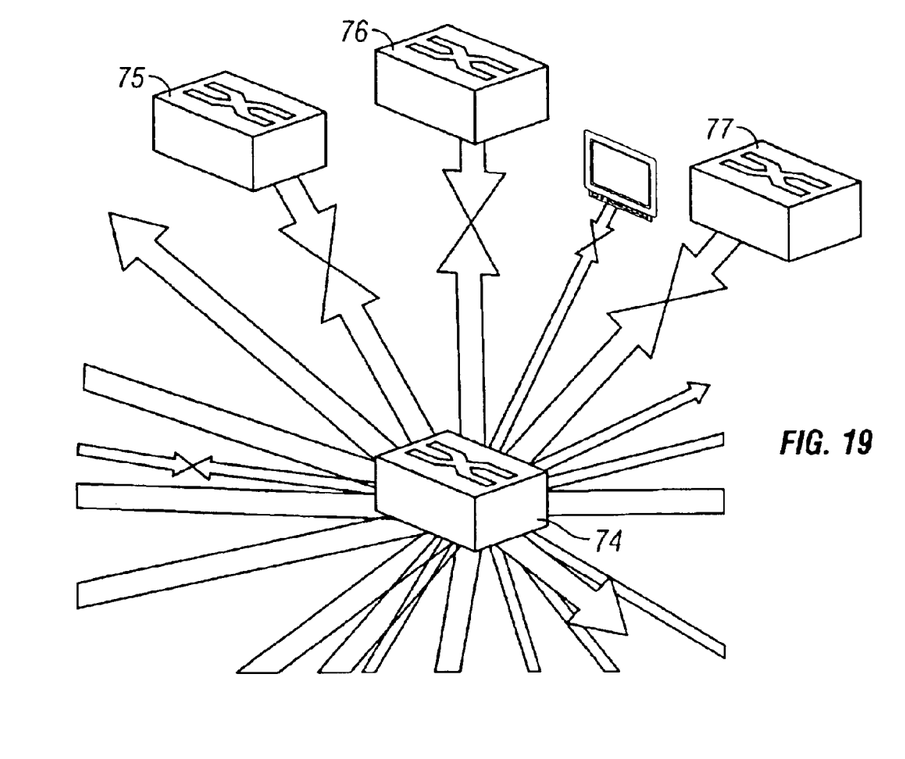
FIG. 19 is a display generated by the visualization program of FIG. 17 using the topology of FIG. 18.

An example of the operation of the flow diagram of FIG. 17 is now described with respect to FIGS. 18 and 19. FIG. 18 shows a topology representation which could be selected at the block 60. In this topology there are four network devices 74, 75, 76 and 77. These devices are connected by various links, as shown. At the block 62, the user selects a view that will display traffic per VLAN. VLANs are logical networks that share a same physical network. VLANs are identified by numbers in the range [1 . . . 1024]. A VLAN number is comparable to a link metric. This view specifies the ideal metrics that are required and the alternative metrics that could provide the same information. For each device 74–77 the workload metric (the number of packets across the device) is the ideal metric. There is no alternate metric. On each link, the input and output throughput metrics are the ideal metrics. Alternative metrics are described above relative to association methods between metrics and mappings. For each link the VLAN number metric is an ideal metric. This metric should be available from any one of the two ends of the link. An alternative metric is the VLAN number metric from the opposite end of the link. The system 20 compares the ideal metric list with what is available from the selected elements that make the selected type topology. Alternate metric choice methods are applied when ideal metrics are not available. The system builds the list of available metrics for each network element.

After the user selects the time or interval for analysis, the minimum and maximum values are searched over the specified interval in order to set the scales at the block 68. On this topology, four devices 74–77 provide the workload metric. The query gets the following samples (one per each five minutes between 2 a.m. and 2:30 a.m.):

| Device/Date/Value | 2:00 AM | 2:05 AM | 2:10 AM | 2:15 AM | 2:20 AM | 2:25 AM |
| --- | --- | --- | --- | --- | --- | --- |
| Device 74 | 50 pp/s | 200 pp/s | 30 pp/s | 210 pp/s | 25 pp/s | 35 pp/s |
| Device 75 | 20 pp/s | 40 pp/s | 28 pp/s | 30 pp/s | 40 pp/s | 40 pp/s |
| Device 76 | 45 pp/s | 100 pp/s | 110 pp/s | 40 pp/s | 80 pp/s | 35 pp/s |
| Device 77 | 50 pp/s | 60 pp/s | 40 pp/s | 35 pp/s | 25 pp/s | 10 pp/s |

The lowest value of the scale for the workload type of metric is set to 10 pp/s per second, as determined by device 77 at 2:25 a.m. The highest value of the scale is set to 210 pp/s per second, as determined by the device 74 at 2:15 a.m. The same processes are run for the input and output throughput and VLAN number metrics.

Thereafter, the view system is used to get from the view how to represent the metrics. This view specifies to represent the workload metric as a node size variation, the input and output throughput metric as bidirectional arrows with variable thickness, and the VLAN number metric as link color, one color per VLAN number. The mapping rules are applied to represent sample values according to the specified mappings as illustrated in FIG. 19. Particularly, FIG. 19 illustrates the results at 2:15 a.m. The Device 74 has the highest workload (210 pp/s) and the other devices 75, 76, 77 have a similar and rather low relative workload (30, 40 and 35 pp/s). One can visually see in FIG. 19 that Device 74 is the most used device on this network and that the other devices have a similar load relative to one another. The links are colored according to their VLAN number. Each distinct VLAN is assigned a different color. In the illustrated embodiment of the invention, five different VLANs cross the Device 74 and are helpful in analyzing the traffic distribution per VLAN. Bidirectional arrow thickness represents the input and output throughput for each link. The thicker the arrow, the greater the traffic in that direction.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

Thus, in accordance with the invention there is provided a new and effective way of analyzing collected performance and flow information for large networks, allowing a user to understand what's happening on a network.

We claim:

1. A method for mapping performance and flow analysis of a communication network having devices connected by links for display on a display device, comprising:
    storing in a memory a graphical representation of the communication network and showing the devices connected by links;
    storing in a memory data representing performance and flows in the communication network;
    storing a plurality of symbols representing different devices and a plurality of edges representing links;
    selectively mapping the data on the graphical representation of the communication network by varying visual characteristics of the symbols and the edges responsive to the performance and flows in the communication network to build a graphical display; and
    displaying the graphical display on a video display device, wherein the displayed edges comprise bidirectional arrows for oriented metrics and varying visual characteristics of the bidirectional arrows comprise varying thickness of the arrows and contact point of the arrows.

2. The method of claim 1 wherein selectively mapping the data comprises mapping the data on the graphical representation of the communication network by varying size of the symbols and the edges for viewing on the display device responsive to variation in performance and flows in the communication network.

3. The system of claim 1 wherein selectively mapping the data comprises mapping the data on the graphical representation of the communication network by varying color of the symbols and the edges for viewing on the display device responsive to variation in performance and flows in the communication network.

4. The system of claim 1 wherein the edges comprise layered lines with each layer representing a different metric.

5. A system for mapping performance and flow analysis of a communication network having devices connected by links, comprising:
    a first memory for storing a graphical representation of the communication network and showing the devices connected by links;
    a second memory storing data representing performance and flows in the communication network;
    a third memory storing a plurality of symbols representing different devices and a plurality of edges representing links;
    processing means for selectively mapping the data on the graphical representation of the communication network by varying visual characteristics of the symbols and the edges responsive to the performance and flows in the communication network to build a graphical display, wherein the edges comprise layered lines with each layer representing a different metric and the processing means maps the data on the graphical representation of the communication network by varying visual characteristics of each layer independently responsive to variation in performance and flows in the communication network.

6. The system of claim 5 wherein the processing means maps the data on the graphical representation of the communication network by varying size of the symbols and the edges responsive to variation in performance and flows in the communication network.

7. The system of claim 5 wherein the processing means maps the data on the graphical representation of the communication network by varying color of the symbols and the edges responsive to variation in performance and flows in the communication network.

8. The system of claim 5 wherein the edges comprise bidirectional arrows for oriented metrics and the processing means varying visual characteristics of the bidirectional arrows comprises varying thickness of the arrows and contact point of the arrows.

* * * * *

UNITED STATES PATENT AND TRADEMARK OFFICE
CERTIFICATE OF CORRECTION

PATENT NO. : 6,900,822 B2 Page 1 of 1
APPLICATION NO. : 09/923567
DATED : May 31, 2005
INVENTOR(S) : Pierre Germain and Philippe Nicolai It is certified that error appears in the above-identified patent and that said Letters Patent is hereby corrected as shown below:

On Title page, Item [73], lines 2, the second inventor "Philippe Nicolal" should read --Philipee Nicolai--.

Signed and Sealed this

Eighteenth Day of July, 2006

JON W. DUDAS
*Director of the United States Patent and Trademark Office*